(12) United States Patent
Kishimoto et al.

(10) Patent No.: US 7,522,013 B2
(45) Date of Patent: Apr. 21, 2009

(54) NON-RECIPROCAL CIRCUIT DEVICE

(75) Inventors: Yasushi Kishimoto, Tottori (JP);
Takefumi Terawaki, Tottori (JP);
Minori Nozu, Tottori (JP)

(73) Assignee: Hitachi Metals, Ltd., Tokyo (JP)

( * ) Notice: Subject to any disclaimer, the term of this patent is extended or adjusted under 35 U.S.C. 154(b) by 209 days.

(21) Appl. No.: 11/573,086

(22) PCT Filed: Aug. 2, 2005

(86) PCT No.: PCT/JP2005/014126

§ 371 (c)(1),
(2), (4) Date: Feb. 1, 2007

(87) PCT Pub. No.: WO2006/013865

PCT Pub. Date: Feb. 9, 2006

(65) Prior Publication Data

US 2008/0001682 A1    Jan. 3, 2008

(30) Foreign Application Priority Data

Aug. 3, 2004 (JP) ............................. 2004-226391

(51) Int. Cl.
*H01P 1/32* (2006.01)
*H01P 1/36* (2006.01)
(52) U.S. Cl. ...................................... 333/24.2; 333/1.1
(58) Field of Classification Search .................. 333/1.1, 333/24.2
See application file for complete search history.

(56) References Cited

U.S. PATENT DOCUMENTS

2004/0207479 A1    10/2004    Hasagawa

FOREIGN PATENT DOCUMENTS

| JP | 59107134 U | 7/1984 |
| JP | 60167327 U | 11/1985 |
| JP | 63150910 A | 6/1988 |
| JP | 04-255206 | 9/1992 |
| JP | 07-058525 | 3/1995 |
| JP | 2004-088743 | 3/2004 |

*Primary Examiner*—Stephen E Jones
(74) *Attorney, Agent, or Firm*—Sughrue Mion, PLLC

(57) ABSTRACT

A non-reciprocal circuit device comprising a first inductance element connected between a first input/output port and a second input/output port, a second inductance element connected between the second input/output port and the ground, a first capacitance element connected between the first input/output port and the second input/output port for constituting a parallel resonance circuit with the first inductance element, a second capacitance element connected between the second input/output port and the ground for constituting a parallel resonance circuit with the second inductance element, and a resistance element connected between the first input/output port and the second input/output port, the first and/or second capacitance elements being constituted by parallel-connecting capacitors formed by electrode patterns in a multilayer substrate comprising dielectric sheets and the electrode patterns to chip capacitors mounted onto the multilayer substrate.

11 Claims, 9 Drawing Sheets

NON-RECIPROCAL CIRCUIT DEVICE

FIELD OF THE INVENTION

The present invention relates to a non-reciprocal circuit device having non-reciprocal transmission characteristics to high-frequency signals, particularly to a non-reciprocal circuit device generally called "isolator," which is used in mobile communications systems such as cell phones, etc.

BACKGROUND OF THE INVENTION

Non-reciprocal circuit devices such as isolators, etc. are widely used in mobile communications apparatuses utilizing frequency bands from several hundreds MHz to ten-odd GHz, such as base stations for personal handy phones PHS, cell phones, etc. The isolator is disposed, for instance, between a power amplifier and an antenna in a transmission path in a mobile communications apparatus, to prevent unnecessary signals from flowing back to the power amplifier and stabilize impedance on the load side of the power amplifier. Accordingly, the isolator is required to have excellent insertion loss characteristics, reflection loss characteristics and isolation characteristics.

FIG. 8 shows a three-pair-terminal isolator as one example of such isolators. This isolator comprises a microwave ferrite 38, three electrically-insulated central conductors 31, 32, 33 crossing each other at an angle of 120° on a main surface of the microwave ferrite 38, matching capacitors C1-C3 each connected to one end of each central conductor 31, 32, 33, and a termination resistor Rt connected to any one port (for instance, P3) of the central conductors 31, 32, 33. The other end of each central conductors 31, 32, 33 is connected to the ground. A DC magnetic field Hdc is axially applied from a permanent magnet (not shown) to the ferrite 38. In this isolator, a high-frequency input from a signal port P1 is transmitted to a port P2, while reflected waves from the port P2 are absorbed by the termination resistor Rt without being transmitted to the port P1. Thus, unnecessary reflected waves are prevented from inversely entering to a power amplifier, etc.

Recently proposed is an isolator constituted by a different equivalent circuit from that of such three-pair-terminal isolator and having excellent insertion loss characteristics and reflection loss characteristics (JP2004-88743A). This isolator having two central conductors is called "two-pair-terminal isolator." FIG. 9 shows an equivalent circuit of the two-pair-terminal isolator, and FIG. 10 is an exploded perspective view showing its parts. This two-pair-terminal isolator comprises a first inductance element L1 formed by a first central conductor 21 disposed between a first input/output port P1 and a second input/output port P2, a second inductance element L2 formed by a second central conductor 22 disposed between the second input/output port P2 and the ground such that it crosses the first central conductor 21 with electric insulation, a first capacitance element C1 disposed between the first input/output port P1 and the second input/output port P2 for constituting a first parallel resonance circuit with the first inductance element L1, a resistance element R, and a second capacitance element C2 disposed between the second input/output port P2 and the ground for constituting a second parallel resonance circuit with the second inductance element L2.

When a high-frequency signal is conveyed from the first input/output port P1 to the second input/output port P2, the first parallel resonance circuit between the first input/output port P1 and the second input/output port P2 is not resonated, while the second parallel resonance circuit is resonated, resulting in small transmission loss (excellent insertion loss characteristics). Current inversely flowing from the second input/output port P2 to the first input/output port P1 is absorbed by the resistance element R between the first input/output port P1 and the second input/output port P2.

As shown in FIG. 10, the two-pair-terminal isolator 1 comprises cases (upper case 4 and lower case 8) made of ferromagnetic metals such as soft iron, etc. to constitute a magnetic circuit, a permanent magnet 9, a central conductor assembly 30 comprising a microwave ferrite 20 and central conductors 21, 22, and a multilayer substrate 50, onto which the central conductor assembly 30 is mounted. The central conductor assembly 30 comprises a disc-shaped microwave ferrite 20, and first and second central conductors 21, 22 disposed on an upper surface of the microwave ferrite 20 such that they cross each other via an insulating layer (not shown). Each of the first and second central conductors 21, 22 is constituted by two lines, both end portions of each line extending along a lower surface of the microwave ferrite 20 with mutual separation.

The multilayer substrate 50 comprises a first capacitance element C1 constituting the first parallel resonance circuit, a second capacitance element C2 constituting the second parallel resonance circuit, and a resistance element R. FIG. 11 is an exploded perspective view showing each part of the multilayer substrate 50. The multilayer substrate 50 comprises electrodes 51-54 connected to the end portions of the central conductors 21, 22, a dielectric sheet 41 provided with capacitor electrodes 55, 56 and a resistor 27 on the rear surface, a dielectric sheet 42 provided with a capacitor electrode 57 on the rear surface, a dielectric sheet 43 provided with a ground electrode 58 on the rear surface, dielectric sheets 44, 45 provided with an external input electrode 14, an external output electrode 15 and external ground electrodes 16, etc. The capacitor electrodes 55, 57 constitute the first capacitance element C1, and the capacitor electrodes 56, 57 constitute the second capacitance element C2. Black circles show via-holes in the figure.

One end portion of the first central conductor 21 is connected to the external input electrode 14 via the electrode 51. The other end portion of the first central conductor 21 is connected to the external output electrode 15 via the electrode 54. One end portion of the second central conductor 22 is connected to the external output electrode 15 via the electrode 53. The other end portion of the second central conductor 22 is connected to the external ground electrode 16 via the electrode 52.

In the two-pair-terminal isolator, a resonance frequency (hereinafter referred to as "peak frequency") for providing the maximum isolation is determined by adjusting the first inductance element L1 and the first capacitance C1 formed by the first central conductor 21, and a peak frequency for providing the minimum insertion loss is determined by adjusting the second inductance element L2 and the second capacitance C2 formed by the second central conductor 22. Thus, the electric characteristics of the two-pair-terminal isolator are determined by adjusting the first and second inductance elements L1, L2 and the first and second capacitances C1, C2 depending on the frequency of a communications system used in a communications apparatus. Accordingly, to obtain a two-pair-terminal isolator with excellent electric characteristics, it is important to form the first and second inductance elements L1, L2 and the first and second capacitance elements C1, C2 with high accuracy and little variations.

However, because the inductance and capacitance of such parts vary by their various factors, it is almost difficult to get a constant peak frequency, resulting in many two-pair-terminal isolators failing to have the desired electric characteristics.

The variations of electric characteristics caused by the first and second inductance elements L1, L2 can be reduced by adjusting the magnet force of the permanent magnet by a magnetizing coil, because their inductances are determined by the widths of the central conductors and their gaps, the magnetic characteristics and size of the microwave ferrite, and the DC magnetic field generated from the permanent magnet. With respect to the variations of electric characteristics caused by the first and second capacitance elements C1, C2 formed in the multilayer substrate 50, however, the variations of their capacitances can be reduced only to about ±4% even though various conditions such as the thickness of electrodes, dielectric sheets, etc. are controlled at high accuracy, because their capacitances are determined by the dielectric characteristics of dielectric sheets, the areas and gaps of capacitor electrodes, etc.

In a two-pair-terminal isolator for an 800-MHz band, for instance, its peak frequency shifts by several MHz when the capacitances of the first and second capacitance elements C1, C2 vary 1% from the desired level. When the variations exceed ±3%, the two-pair-terminal isolator fails to meet its standards. Accordingly, the capacitance variations should be within ±3%, preferably within ±2%, of the desired capacitance.

As described above, because it is difficult to suppress capacitance variations by adjusting the thickness of electrodes, dielectric sheets, etc., electrode patterns formed in the multilayer substrate have conventionally been trimmed by a laser. However, the capacitance adjustment of the first and second capacitance elements C1, C2 by trimming causes the breakage, cracking, etc. of the multilayer substrate, resulting in an extremely reduced production yield.

OBJECTS OF THE INVENTION

Accordingly, an object of the present invention is to provide a non-reciprocal circuit device with reduced capacitance variations of first and second capacitance elements, thereby having excellent electric characteristics.

Another object of the present invention is to provide a method for producing a non-reciprocal circuit device having excellent electric characteristics at high yield by reducing the capacitance variations of first and second capacitance elements without resorting to working such as trimming.

DISCLOSURE OF THE INVENTION

The non-reciprocal circuit device of the present invention comprises a first inductance element connected between a first input/output port and a second input/output port, a second inductance element connected between the second input/output port and the ground, a first capacitance element connected between the first input/output port and the second input/output port for constituting a parallel resonance circuit with the first inductance element, a second capacitance element connected between the second input/output port and the ground for constituting a parallel resonance circuit with the second inductance element, and a resistance element connected between the first input/output port and the second input/output port, the first and/or second capacitance elements being constituted by parallel-connecting capacitors formed by electrode patterns in a multilayer substrate comprising dielectric sheets and the electrode patterns to chip capacitors mounted onto the multilayer substrate.

The capacitor formed in the multilayer substrate preferably has larger capacitance than that of the chip capacitor. The capacitance variations of the first and/or second capacitance elements can be reduced by selecting the capacitances of the chip capacitors.

A central conductor assembly comprising a first central conductor constituting the first inductance element, a second central conductor constituting the second inductance element, and a microwave ferrite member, on which the first and second central conductors are crossing, is preferably placed on the multilayer substrate. It is preferable that the first central conductor comprises pluralities of conductor lines, while the second central conductor comprises one conductor line. The first inductance element preferably has smaller inductance than that of the second inductance element.

The first to third electrode patterns are preferably formed on a surface of the multilayer substrate, on which the central conductor assembly is placed, the first electrode pattern being connected to a center portion of the central conductor, the second electrode pattern being connected to a tip end portion of the first central conductor of the central conductor, and the third electrode pattern being connected to a tip end portion of the second central conductor of the central conductor.

Input and output terminals are preferably formed on a rear surface of the multilayer substrate. The first and second electrode patterns are preferably connected to the output and input terminals, respectively, both through via-holes formed in the multilayer substrate.

The method of the present invention for producing a non-reciprocal circuit device comprising a first inductance element connected between a first input/output port and a second input/output port, a second inductance element connected between the second input/output port and the ground, a first capacitance element connected between the first input/output port and the second input/output port for constituting a parallel resonance circuit with the first inductance element, a second capacitance element connected between the second input/output port and the ground for constituting a parallel resonance circuit with the second inductance element, and a resistance element connected between the first input/output port and the second input/output port, the first and/or second capacitance elements being constituted by pluralities of parallel-connected capacitors, part of the plural capacitors being formed by electrode patterns in a multilayer substrate comprising dielectric sheets and the electrode patterns, comprises the steps of (a) measuring the capacitance of each capacitor formed in the multilayer substrate, (b) comparing the measured capacitance and each capacitance set for the first and/or second capacitance elements to determine their difference, and (c) mounting one or more chip capacitors each having capacitance corresponding to the above difference of capacitance onto the multilayer substrate.

It is preferable that a motherboard comprising pluralities of the multilayer substrates is formed, and that the capacitance of each capacitor formed in each multilayer substrate is measured to attach a mark to a multilayer substrate, whose measured capacitance is outside the set capacitance. The chip capacitor is mounted onto only a multilayer substrate free from the mark.

DESCRIPTION OF THE PREFERRED EMBODIMENTS

Figure 1:
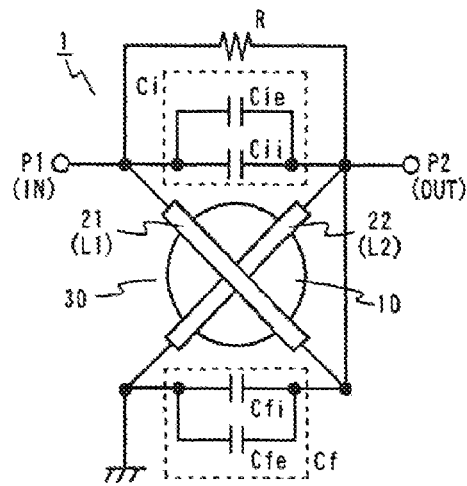
FIG. 1 is a view showing an equivalent circuit of a non-reciprocal circuit device according to one embodiment of the present invention.
Figure 2:
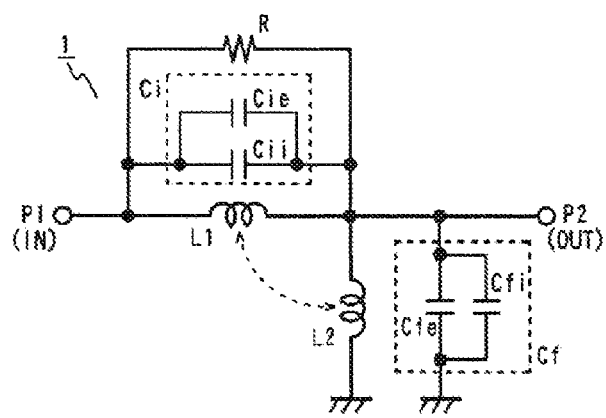
FIG. 2 is a view showing an equivalent circuit of the non-reciprocal circuit device according to one embodiment of the present invention.

FIGS. 1 and 2 show the equivalent circuit of a two-pair-terminal isolator, as a non-reciprocal circuit device according to one embodiment of the present invention. FIG. 1 indicates a central conductor assembly as a shaped part, and FIG. 2 indicates the central conductor assembly by an equivalent circuit comprising a first inductance element L1 and a second inductance element L2.

This non-reciprocal circuit device comprises a first inductance element L1 connected between a first input/output port P1 and a second input/output port P2, a second inductance element L2 connected between the second input/output port P2 and the ground, a first capacitance element Ci (synthesized capacitance of capacitors Cie and Cii) connected between the first input/output port P1 and the second input/output port P2 for constituting a first parallel resonance circuit with the first inductance element L1, a second capacitance element Cf (synthesized capacitance of capacitors Cfe and Cfi) connected between the second input/output port P2 and the ground for constituting a second parallel resonance circuit with the second inductance element L2, and a resistance element R connected between the first input/output port P1 and the second input/output port P2.

Figure 3:
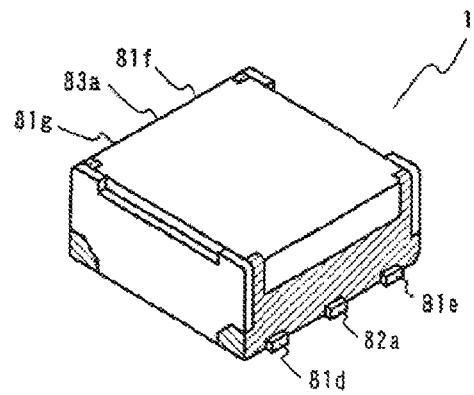
FIG. 3 is a perspective view showing the non-reciprocal circuit device according to one embodiment of the present invention.
Figure 4:
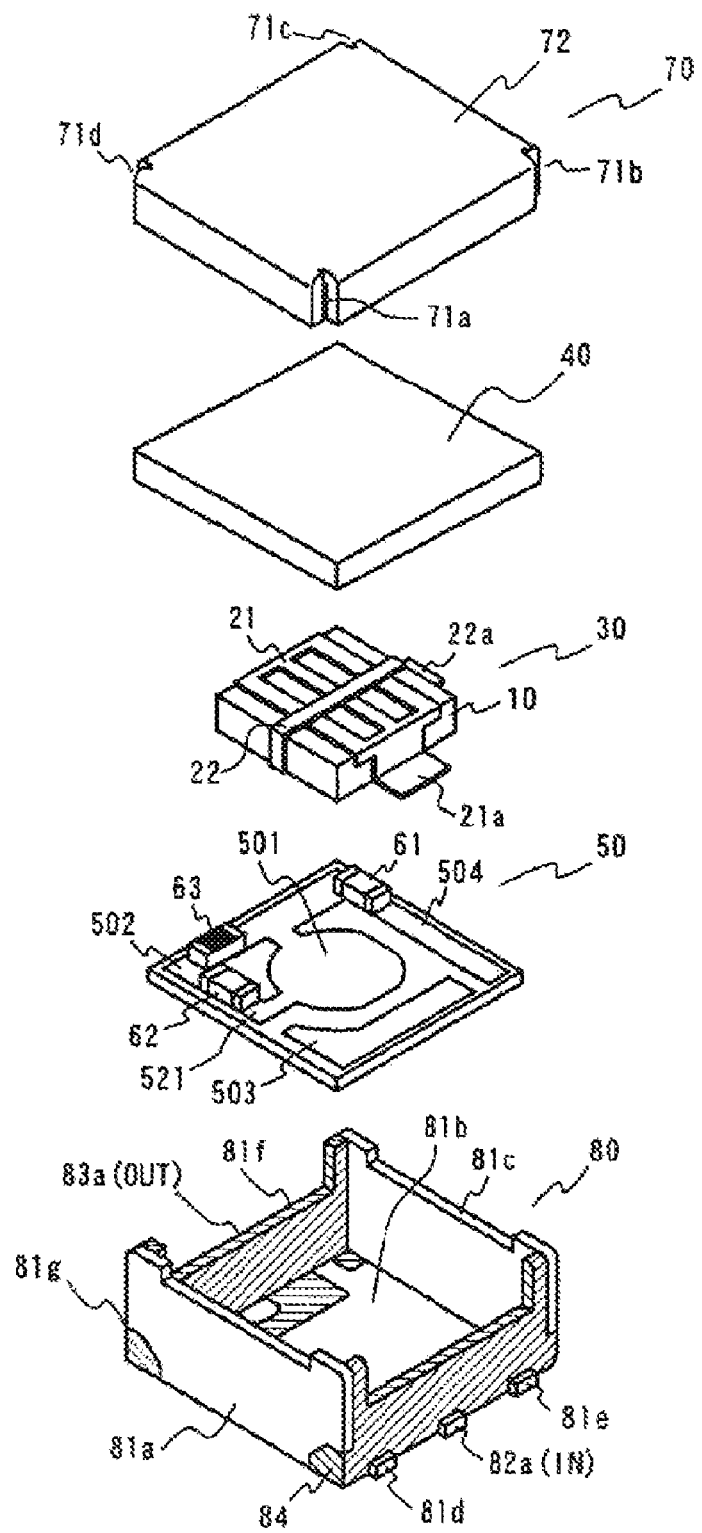
FIG. 4 is an exploded perspective view showing the non-reciprocal circuit device according to one embodiment of the present invention.

FIG. 3 shows the appearance of the non-reciprocal circuit device according to one embodiment of the present invention, and FIG. 4 shows its parts. The non-reciprocal circuit device 1 comprises a central conductor assembly 30 comprising a microwave ferrite 10, and a central conductor surrounding the microwave ferrite 10, which comprises a first central conductor 21 and a second central conductor 22 crossing with electric insulation on the microwave ferrite 10; a multilayer substrate 50 comprising capacitors Cii and Cfi formed inside, and electrode patterns for mounting chip capacitors 62, 61 as capacitors Cie, Cfe, input/output electrodes IN, OUT and a ground electrode GND formed on the surface; a resin case 80 receiving the multilayer substrate 50; a permanent magnet 40 applying a DC magnetic field to the microwave ferrite 10; and an upper case 70 containing the permanent magnet 40 and engaging the resin case 80.

Each of the first and second capacitance elements Ci, Cf is constituted by a capacitor Cii, Cfi formed in the multilayer substrate 50 and a chip capacitor Cie, Cfe mounted onto an outer surface of the multilayer substrate 50, which are parallel-connected to have the synthesized capacitance of these capacitance elements. The capacitance element Cii, Cfi formed in the multilayer substrate 50 has smaller capacitance than that of the first or second capacitance element Ci, Cf. The capacitance variations of the capacitors Cii, Cfi are reduced by the chip capacitors Cie, Cfe mounted onto an outer surface of the multilayer substrate 50.

The multilayer substrate 50 is formed by printing a conductive paste comprising Ag, Cu, etc. as a main component on each dielectric sheet made of a low-temperature cofirable ceramic (LTCC) to form a desired conductor pattern, and laminating and sintering pluralities of dielectric sheets each having a conductor pattern, such that pluralities of capacitance elements are integrated.

Figure 6:
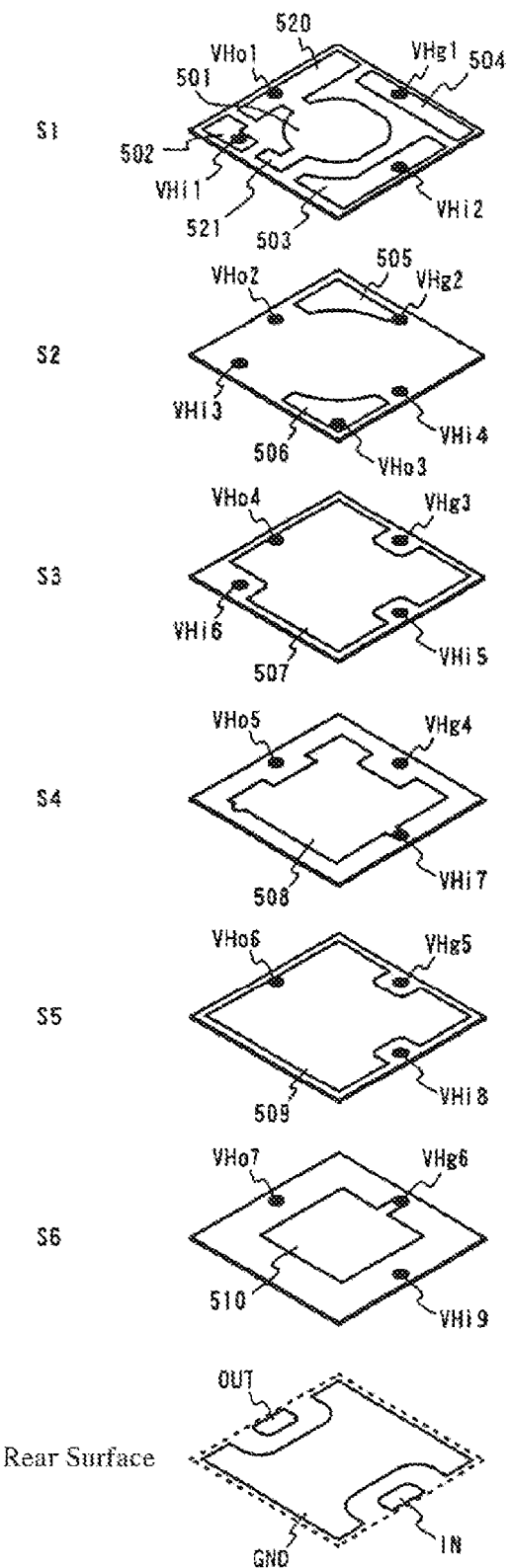
FIG. 6 is an exploded perspective view showing a multilayer substrate used in the non-reciprocal circuit device of the present invention.

As shown in FIG. 6, a dielectric sheet S1 is provided with electrode patterns 501-504, 520, 521, a dielectric sheet S2 is provided with electrode patterns 505, 506, a dielectric sheet S3 is provided with an electrode pattern 507, a dielectric sheet S4 is provided with an electrode pattern 508, a dielectric sheet S5 is provided with an electrode pattern 509, and a dielectric sheet S6 is provided with an electrode pattern 510. An electrode pattern for an input terminal IN and an electrode pattern for an output terminal OUT are formed on both sides of a ground electrode GND on the rear surface of the multilayer substrate 50.

Electrode patterns on the dielectric sheets S1-S6 are properly electrically connected through via-holes VHg1-VHg6, VHi1-VHi9, VHo1-VHo7 filled with a conductive paste. The via-holes VHg1-VHg6 electrically connect the electrode patterns 504, 505, 510 to the ground electrode GND, the via-holes VHi1-VHi9 electrically connect the electrode pattern 502 to the input terminal IN via an electrode pattern 508, and the via-holes VHo1-VHo7 electrically connect the electrode patterns 520, 507, 509 to the output terminal OUT. The electrode patterns 503, 506, 507, 508, 509 constitute the capacitor Cii, and the electrode patterns 520, 505, 507, 509, 510 constitute the capacitor Cfi.

In this embodiment, the electrode patterns constituting the capacitors Cii, Cfi are formed on pluralities of layers, and parallel-connected through via-holes, resulting in a large electrode pattern area per one layer of the multilayer substrate 50 and thus large capacitance. The capacitances of capacitors formed in the multilayer substrate 50 are preferably determined such that their averaged values are smaller than that of the first or second capacitance element Ci, Cf by about 5%, taking into consideration their variations.

The capacitance of the capacitor Cii, Cfi formed in the multilayer substrate 50 is measured, and its difference from the capacitance of the first or second capacitance element Ci, Cf is reduced by the correcting chip capacitors Cie, Cfe. In this embodiment, multilayer capacitors having small capacitance with narrow tolerance are used as the correcting chip capacitors Cie, Cfe. This multilayer capacitor has as small capacitance as 0.1 pF to several pF, with tolerance of ±0.05 pF at 0.5 pF or less, ±0.075 pF at more than 0.5 pF and less than 1.0 pF, and ±0.1 pF at 1.0 pF or more.

Any of the first and second capacitance elements Ci, Cf can be provided with reduced variations without necessitating laser trimming, by using high-precision, correcting capacitance elements selected depending on the capacitance variations of the capacitors Cii, Cfi in the multilayer substrate 50, thereby obtaining the desired capacitance.

An example of the production method of the multilayer substrate will be explained. A slurry comprising ceramic powder, a binder and a plasticizer is uniformly applied by a known sheet-forming method such as a doctor blade method to a carrier film of polyethylene terephthalate, to form a green sheet as thick as from several tens of micrometers to several hundreds of micrometers. After drying, the green sheet is cut to a predetermined size without peeling the carrier sheet.

The ceramic powder is preferably made of dielectric ceramics sinterable at as low temperatures as, for instance, 1000° C. or less. Such low-temperature-sinterable dielectric ceramics include (a) ceramics comprising $Al_2O_3$ as a main component, and at least one of $SiO_2$, SrO, CaO, PbO, $Na_2O$ and $K_2O$ as a sub-component, (b) ceramics comprising $Al_2O_3$ as a main component, and at least one of MgO, $SiO_2$ and GdO as a sub-component, etc. The addition of at least one of $Bi_2O_3$, $Y_2O_3$, $CaCO_3$, $Fe_2O_3$, $In_2O_3$ and $V_2O_5$ enables low-temperature sintering.

A specific example of the compositions of the low-temperature-sinterable dielectric ceramics comprises 10-60% by mass (as $Al_2O_3$) of Al, 25-60% by mass (as $SiO_2$) of Si, 7.5-50% by mass (as SrO) of Sr, and 0-20% by mass (as $TiO_2$) of Ti as main components, $Al_2O_3+SiO_2+SrO+TiO_2$ being 100% by mass, and as a sub-component 0.1-10 parts by mass (as $Bi_2O_3$) of Bi per 100 parts by mass of the total amount of the main components. This dielectric ceramic does not contain Pb, a toxic material. This dielectric ceramic has a dielectric constant of 7-9, as high bending resistance as 240 MPa or more (measured on a test piece having a length of 36 mm, a width of 4 mm and a thickness of 3 mm by a three-point bending test method at a distance of 30 mm between the fulcra according to JIS R 1601), and as high Young's modulus as 110 GPa or more.

The green sheets provided with electrode patterns are laminated and integrally press-bonded to form as thick a planar molding as about 0.35 mm. Pluralities of perpendicularly crossing grooves of about 0.1 mm deep are formed on a main surface of the planar molding at intervals for cutting the planar molding to a predetermined chip size. The cutting grooves are as deep as about 30-150 μm for ease of cutting and handling, though variable depending on the thickness of the planar molding. The planar molding with the cutting grooves is degreased and sintered to provide a motherboard partitioned by the cutting grooves to pluralities of multilayer substrates. When the motherboard comprises 50×30 of multilayer substrates, for instance, the motherboard is preferably as large as about 170 mm×105 mm×0.2 mm.

After capacitors Cii, Cfi are formed in each multilayer substrate in the motherboard, their capacitances are measured by a capacitance tester, etc., to determine the differences between the measured capacitances and the set values. The correcting chip capacitors are then selected based on the capacitance differences, and mounted at predetermined positions on each multilayer substrate. When the capacitance difference determined on a multilayer substrate is, for instance, more than +0.3% or less than −10% of each capacitance value set for the first and second capacitance elements Ci, Cf, such a multilayer substrate is marked as a defective part. It should be noted, however, that the above difference is a mere example of the threshold, which is not restrictive. The image recognition of the mark is conducted to ensure that the chip capacitors are mounted onto only mark-free multilayer substrates, avoiding them from being squandered.

On a main surface of each multilayer substrate, a chip resistor 63 is mounted onto the electrode patterns 502, 520, and the central conductor assembly 30 is mounted onto the first to third electrode patterns 501, 503, 504. A center portion 23 of the central conductor 20 is connected to a substantially circular portion of the first electrode pattern 501, with a tip end portion 21a of the first central conductor 21 connected to the second electrode pattern 503, and a tip end portion 22a of the second central conductor 22 connected to the third electrode pattern 504, each by soldering, etc. In this embodiment, the first electrode pattern 501 has a substantially circular shape, such that there is large insulation distance from the surrounding electrode patterns 502, 503, 504, while each surrounding electrode pattern 502, 503, 504 has as large an area as possible.

The motherboard is finally divided along the cutting grooves to obtain multilayer substrates 50 each having an overall size of 2.6 mm×2.6 mm×0.2 mm. Though the cutting grooves can be formed by a steel blade, such cutting means as a dicing saw, a laser, etc. may be used when they are formed after sintering.

With the low-temperature-sinterable ceramics used for the multilayer substrate 50, high-conductivity metals such as Ag, Cu, Au, etc. can be used for the electrode patterns. The use of dielectric materials having high Q values and electrodes with low electric resistance loss can produce a non-reciprocal circuit device having extremely small loss.

In the central conductor assembly 30, the first central conductor 21 and the second central conductor 22 are crossing via an insulating layer (not shown), for instance, on the rectangular microwave ferrite 10. In this embodiment, the first central conductor 21 and the second central conductor 22 are perpendicular to each other at a crossing angle of 90°, though a crossing angle other than 90° is within the scope of the present invention. In general, the first central conductor 21 and the second central conductor 22 need only be crossing in an angle range of 80° to 110°.

Figure 5A:
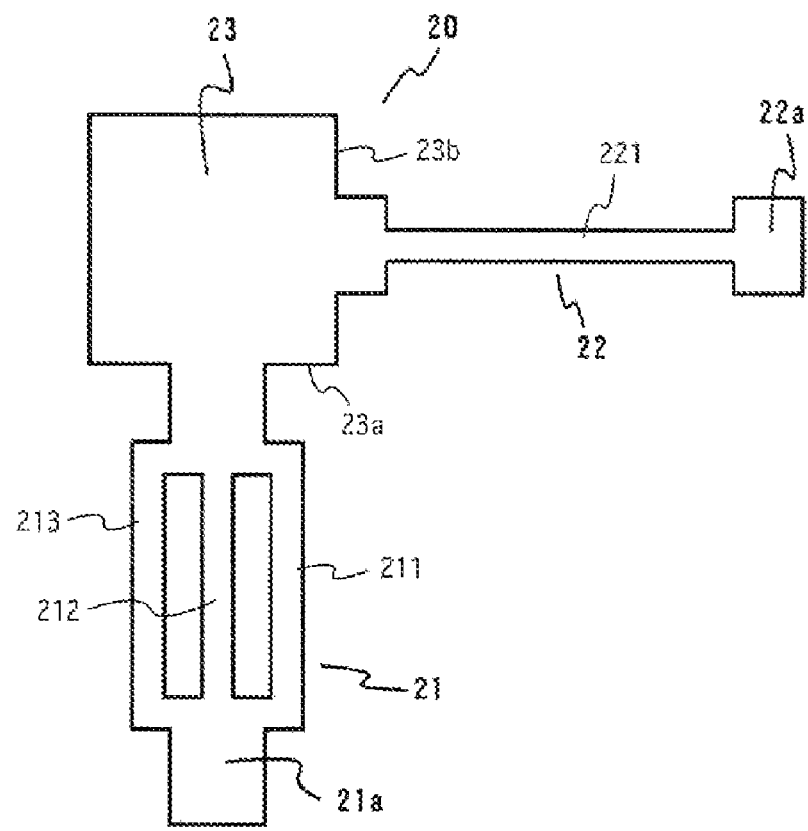
FIG. 5(a) is a plan development showing a central conductor used in the non-reciprocal circuit device according to one embodiment of the present invention.
Figure 5B:
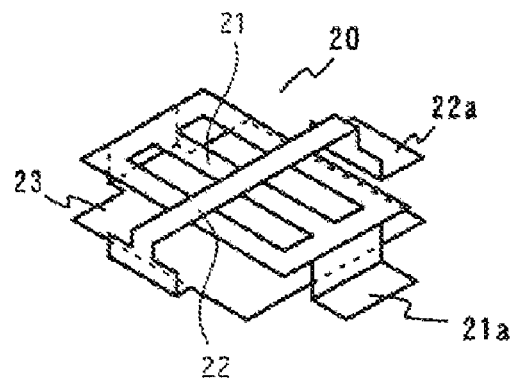
FIG. 5(b) is a perspective view showing the central conductor of FIG. 5(a), which is assembled.

FIG. 5(a) is a plan development of the central conductor 20, and FIG. 5(b) is a perspective view showing the central conductor 20 assembled around the microwave ferrite 10. In FIG. 5(b), the microwave ferrite 10 enclosed by the first central conductor 21 and the second central conductor 22 are omitted, such that the center portion 23 of the central conductor 20 can be seen. The central conductor 20 integrally has the center portion 23, the first central conductor 21 perpendicularly extending from a side 23a of the center portion 23, and the second central conductor 22 perpendicularly extending from another adjacent side 23b of the center portion 23, such that the central conductor 20 is in an L shape as a whole. Such central conductor 20 can be formed, for instance, by punching a 30-μm-thick copper plate. To reduce loss by the skin effect at high frequencies, the copper plate is preferably provided with a silver plating as thick as 1-4 μm.

The first central conductor 21 comprises three parallel conductors (lines) 211-213, and the second central conductor 22 is constituted by one conductor (line) 221. With such structure, the first central conductor 21 has smaller inductance than that of the second central conductor 22, resulting in adjusted impedance. The first and second central conductors 21, 22 respectively have wide tip end portions 21a, 22a, so that they are easily connected to the electrode patterns 503, 504 formed on the multilayer substrate 50.

The first central conductor 21 and the second central conductor 22 may be formed by separate copper plates instead of being integrally formed by a copper plate. Also, the first central conductor 21 and the second central conductor 22 may be formed on both surfaces of a heat-resistant, insulating sheet of plastics such as polyimide by a printing or etching method. Further, the first central conductor 21 and the second central conductor 22 may be printed on the microwave ferrite 10. Thus, the first central conductor 21 and the second central conductor 22 are not restricted with respect to forms.

Because the first central conductor 21 and the second central conductor 22 of the central conductor 20 enclose the microwave ferrite 10, larger inductance is obtained than when the central conductor 20 is simply disposed on a main surface of the microwave ferrite 10. This contributes to the size reduction of the microwave ferrite 10.

The microwave ferrite 10 may be made of magnetic materials ensuring a function as a non-reciprocal circuit device when a DC magnetic field is applied from the permanent magnet 40. The magnetic material is preferably ferrite having a garnet structure such as yttrium-iron-garnet (YIG), though ferrite having a spinel structure such as Ni-based ferrite may be used depending on the used frequencies. In the case of YIG, part of Y may be substituted by Gd, Ca, V, etc., and part of Fe may be substituted by Al, Ga, etc. When the first and second central conductors 21, 22 are formed by printing, the microwave ferrite may contain a desired amount of Bi to enable its co-firing with the electrode patterns constituting the central conductors.

The permanent magnet 40 applying a DC magnetic field to the central conductor assembly 30 is fixed to an inner wall of the upper case 70 by an adhesive, etc. From the aspect of cost and similarity to the microwave ferrite 10 in temperature characteristics, the permanent magnet 40 is preferably a ferrite magnet [for instance, $(Sr/Ba)O.nFe_2O_3$]. The size and thickness reduction of the non-reciprocal circuit device can be achieved by using a ferrite magnet having a magnetoplumbite-type crystal structure and a composition represented by $(Sr/Ba)RO.n(FeM)_2O_3$, wherein R is at least one of rare earth elements including Y, which substitutes for part of Sr and/or Ba, and M is at least one selected from the group consisting of Co, Mn, Ni and Zn, which substitutes for part of Fe, the R element and/or the M element being added in the form of a compound in a pulverization step after calcining, because it has a high magnetic flux density. With respect to magnetic characteristics, the ferrite magnet preferably has a residual magnetic flux density Br of 430 mT or more, particularly 440 mT or more, coercivity iHc of 340 kA/m or more, and a maximum energy product (BH)max of 35 kJ/m$^3$ or more.

Figure 7:
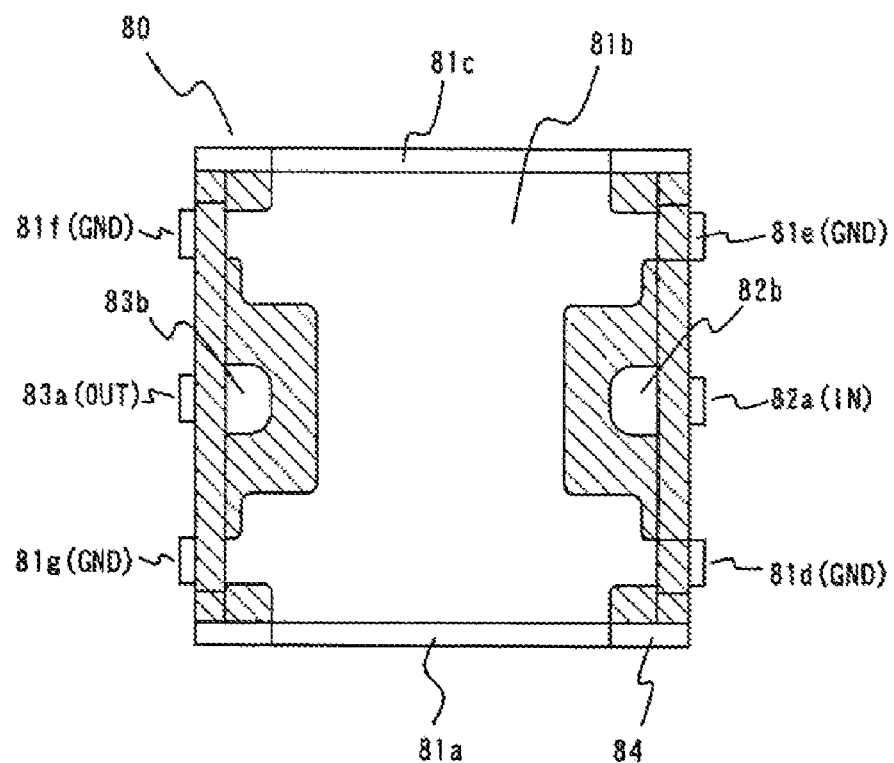
FIG. 7 is a plan view showing a resin case used in the non-reciprocal circuit device of the present invention.
Figure 8:
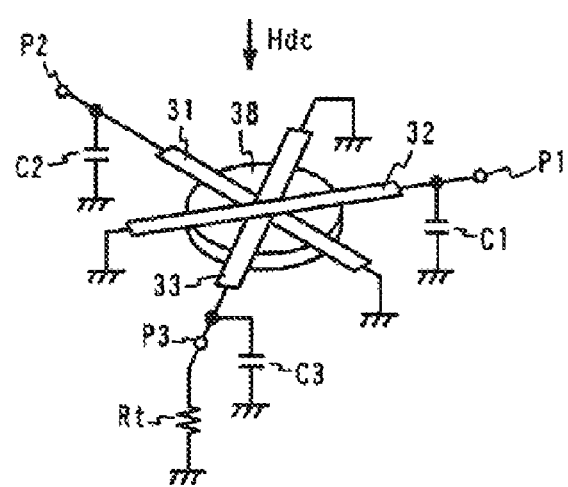
FIG. 8 is a view showing an equivalent circuit of a conventional three-pair-terminal isolator.
Figure 9:
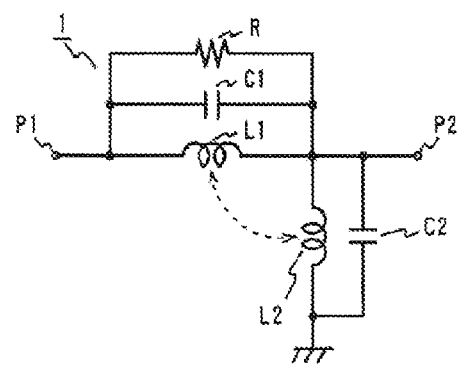
FIG. 9 is a view showing an equivalent circuit of a conventional two-pair-terminal isolator.
Figure 10:
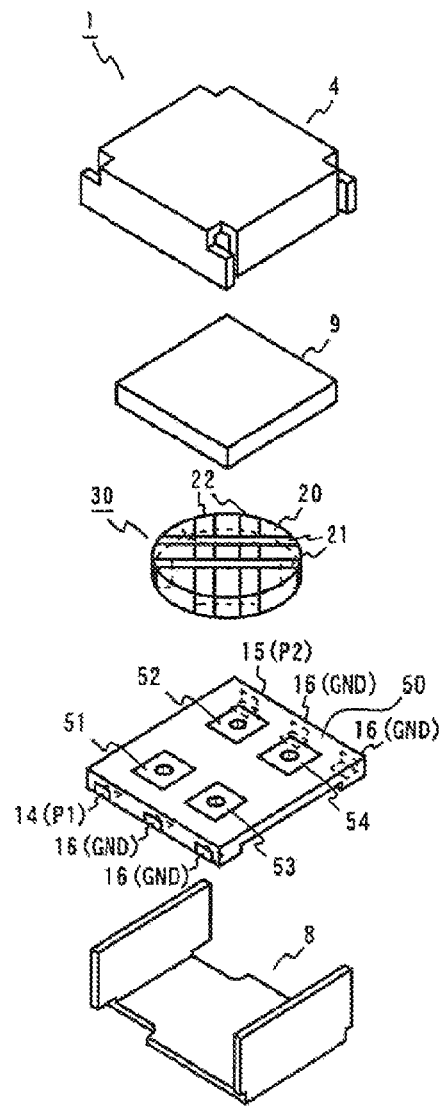
FIG. 10 is an exploded perspective view showing a conventional two-pair-terminal isolator.
Figure 11:
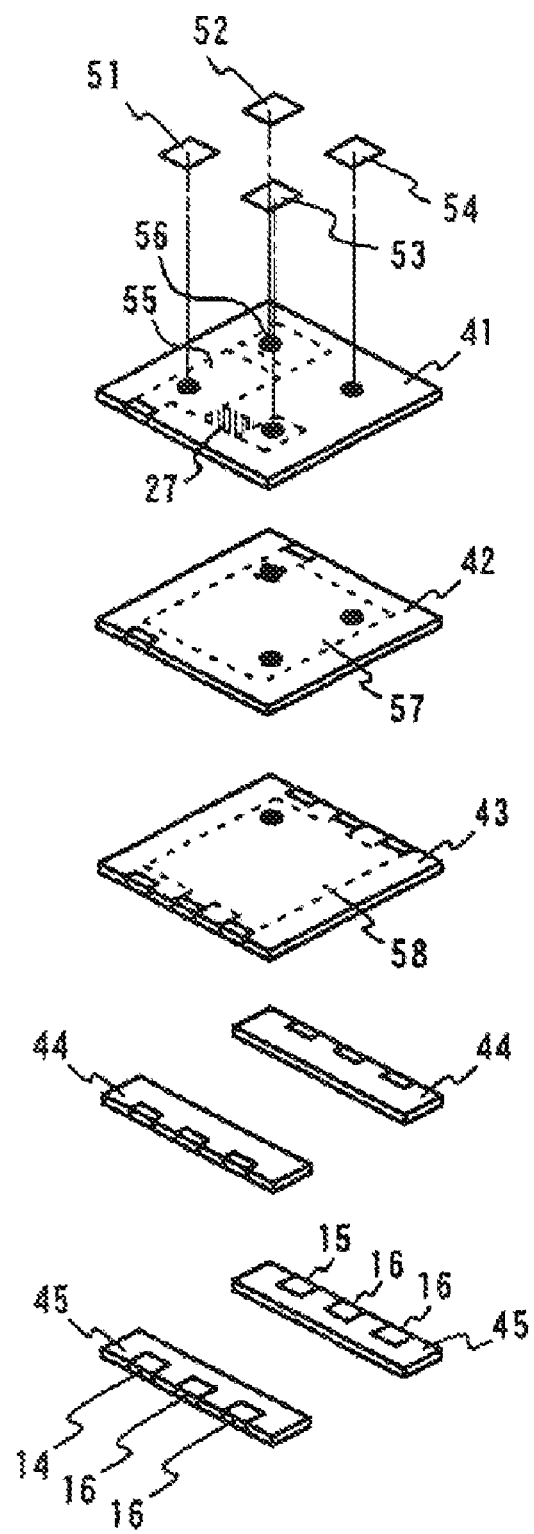
FIG. 11 is an exploded perspective view showing a multilayer substrate used in the conventional two-pair-terminal isolator.

FIG. 7 is a plan view showing the resin case 80. The insert-molded resin case 80 has as thin a metal frame 81 as about 0.1 mm. The metal frame 81, which is formed by the punching, etching, etc. of a metal plate, integrally has a bottom portion 81b, two sidewalls 81a, 81c on both sides, and terminals 81d-81g as ground terminals. Because the sidewalls 81a, 81c of the frame oppose the sidewalls of the upper case 70, the magnetic flux of the permanent magnet 40 can be uniformly supplied to the central conductor assembly 30.

The frame 81 is also integrally provided with an input terminal 82a (IN, first input/output port P1 in the equivalent circuit), and an output terminal 83a (OUT, second input/output port P2 in the equivalent circuit). Because the frame bottom 81b functions as a ground, it is separate from an exposed end portion 82b of the input terminal 82a and an exposed end portion 83b of the output terminal 83a by about 0.3 mm, to ensure electric insulation between the input terminal 82a (IN) and the output terminal 83a (OUT).

The frame 81 is formed by, for instance, SPCC (JIS G3141) having a thickness of about 0.1 mm, and has a Cu plating having a thickness of 1-3 μm and an Ag plating having a thickness of 2-4 μm to have improved high-frequency characteristics.

The multilayer substrate 50 is contained in the resin case 80, with the input and output terminals IN, OUT of the multilayer substrate 50 soldered to the exposed end portions 82b, 83b of the input and output terminals on the resin case 80. The bottom ground GND of the multilayer substrate 50 is soldered to the frame bottom 81b of the resin case 80.

A substantially box-shaped upper case 70 fixed to the sidewalls 81a, 81c of the metal frame 81 insert-molded with the resin case 80 is made of a ferromagnetic material such as soft iron, etc., functioning as a magnetic yoke for a magnetic circuit encircling the permanent magnet 40, the central conductor assembly 30 and the multilayer substrate 50. The upper case 70 is preferably provided with a plating layer of at least one metal selected from the group consisting of Ag, Au, Cu and Al, or its alloy. The electric resistivity of the plating layer is preferably 5.5 μΩ·cm or less, more preferably 3 μΩ·cm or less, most preferably 1.8 μΩ·cm or less. The thickness of the plating layer is preferably 0.5-25 μm, more preferably 0.5-10 μm, most preferably 1-8 μm. Such structure suppresses interference with an external circuit, thereby reducing loss.

The present invention will be explained in detail by the following Examples below, without intention of restricting the scope of the present invention.

CONVENTIONAL EXAMPLE 1

Figure 12:
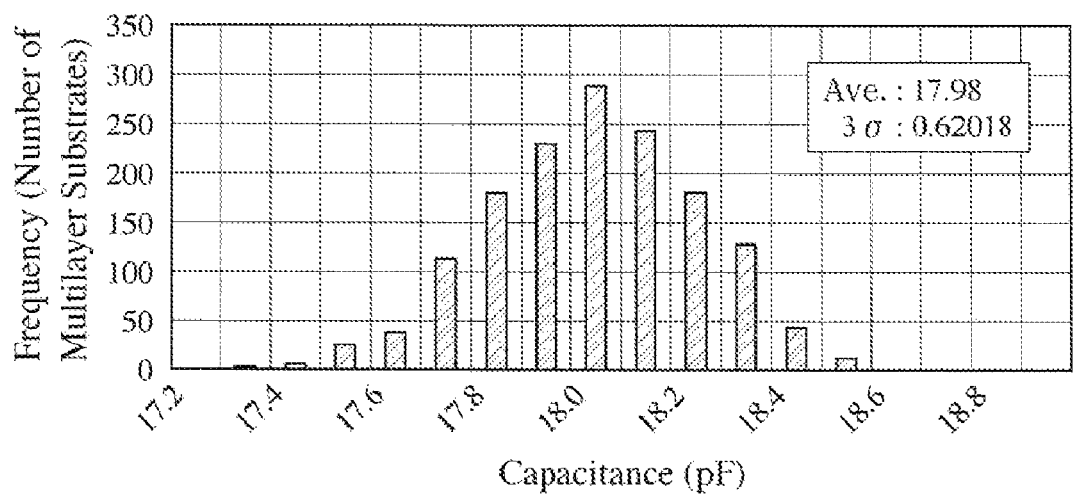
FIG. 12 is a graph showing the capacitance distribution of a second capacitance element formed in the multilayer substrate used in the conventional non-reciprocal circuit device.

With the first and second capacitance elements Ci, Cf set at 29 pF and 18.0 pF, respectively, pluralities of motherboards each having 1500 (50×30) multilayer substrates were produced. The capacitance distribution of the second capacitance elements Cf in 1500 multilayer substrates arbitrarily selected from those obtained by dividing these motherboards is shown in FIG. 12. It is clear from FIG. 12 that the capacitances of the second capacitance elements Cf varied in a range of 17.3-18.5 pF. Some of non-reciprocal circuit devices produced by using such multilayer substrates had insertion loss characteristics outside the required level, with a yield less than 60%. There were similar capacitance variations in the first capacitance elements Ci.

EXAMPLE 1

Figure 13:
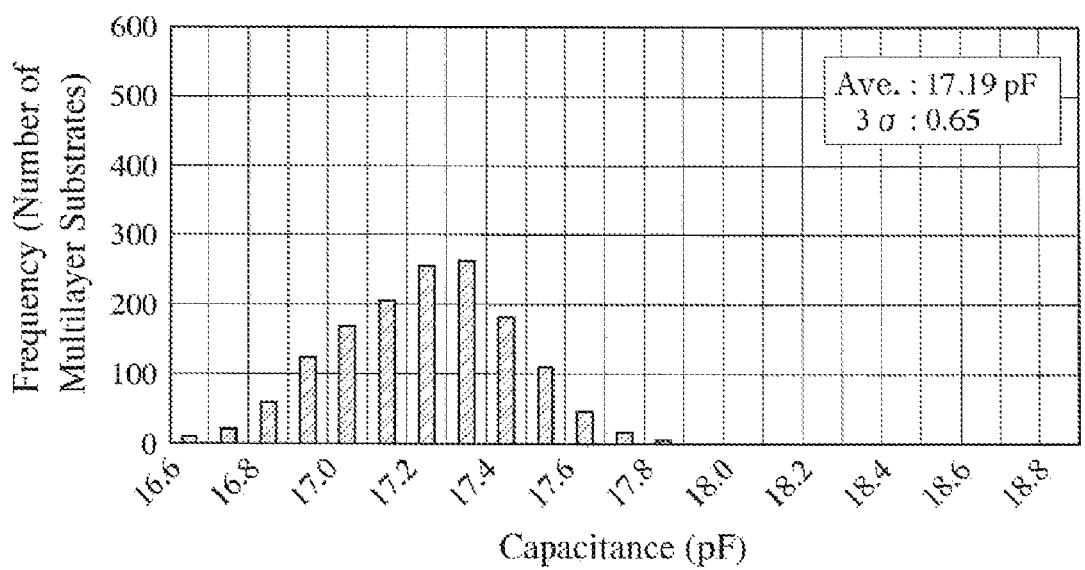
FIG. 13 is a graph showing the capacitance distribution of a capacitor formed in the multilayer substrate used in the non-reciprocal circuit device of the present invention.

With the capacitors Cii, Cfi formed in the multilayer substrates set to have capacitances of 27.6 pF and 17.1 pF, respectively, about 5% smaller than the set values of the first and second capacitance elements Ci, Cf. pluralities of motherboards each having 1500 (50×30) multilayer substrates were produced. The capacitance distribution of the capacitance elements Cfi in 1500 multilayer substrates arbitrarily selected from those obtained by dividing these motherboards is shown in FIG. 13. The capacitors Cfi had capacitances varying in a range of 16.6-17.8 pF like those of Conventional Example 1.

Figure 14:
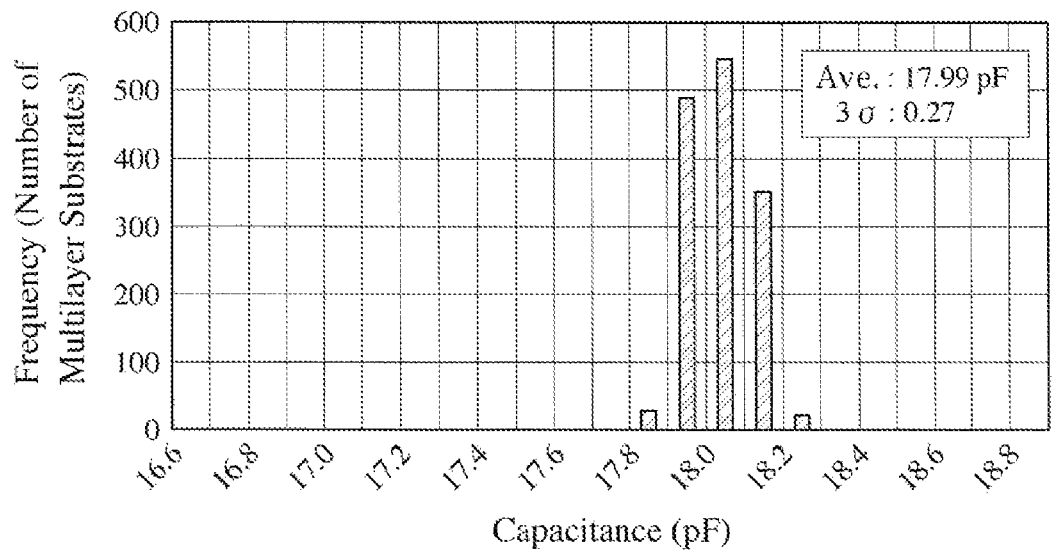
FIG. 14 is a graph showing the capacitance distribution of a second capacitance element (synthesized capacitance) formed in the multilayer substrate used in the non-reciprocal circuit device of the present invention.

With respect to each of these multilayer substrates, the capacitance of each capacitor Cfi was measured, and when the measured value was 16.6 pF or more and less than 17.0 pF, a chip capacitor of 1.2 pF as a correcting chip capacitor Cfe was mounted onto the multilayer substrate. Similarly mounted were a chip capacitor of 1.0 pF when the measured value is 17.0 pF or more and less than 17.2 pF, a chip capacitor of 0.7 pF when the measured value was 17.2 pF or more and less than 17.5 pF, and a chip capacitor of 0.5 pF when the measured value was 17.5 pF or more and less than 17.8 pF. FIG. 14 shows the capacitance distribution after the chip capacitor was mounted. It is clear from FIG. 14 that the mounting of the correcting chip capacitor Cfe turned the capacitances of the second capacitance element Cf in all multilayer substrates to a level within the target value (18.0 pF) ±3%. Likewise, the capacitances of the first capacitance elements Ci were adjusted by using a correcting chip capacitor Cie to a level within 29 pF ±3%.

The resultant multilayer substrate was used to produce an ultra-small non-reciprocal circuit device of 3.2 mm each having a passband frequency of 830-840 MHz. The specification of this non-reciprocal circuit device was as follows:

Microwave ferrite 10: Garnet having of 1.9 mm in diameter and 0.35 mm in thickness.

Permanent magnet 40: Ferrite of 2.8 mm in length, 2.5 mm in width and 0.4 mm in thickness.

Central conductor 20: A 30-μm-thick, L-shaped copper plate with a semi-gloss Ag plating as thick as 1-4 μm formed by etching, which comprised, as shown in FIG. 5, a first central conductor 21 comprising three 0.2-mm-wide, parallel conductors with a gap of 0.25 mm between the conductors and an overall width of 1.1 mm, and a second central conductor 22 comprising a 0.2-mm-wide, single-line conductor.

A chip resistor of 75Ω was mounted by soldering onto the multilayer substrate corrected by the chip capacitor as described above. The resistor may be formed in the multilayer substrate by a printing method.

Figure 15:
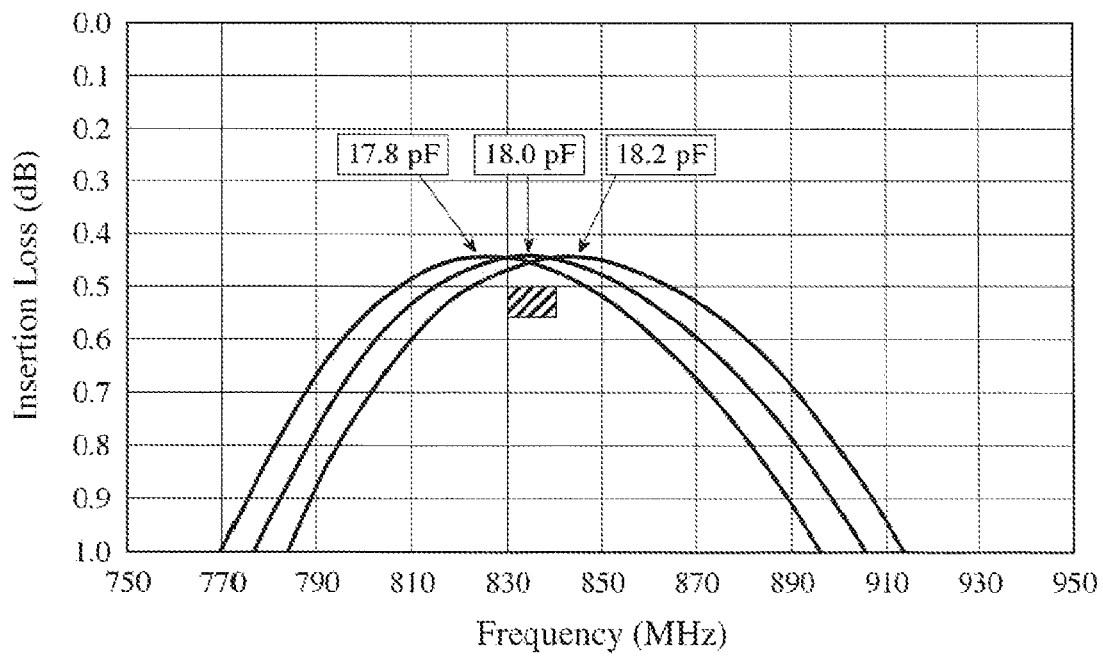
FIG. 15 is a graph showing the insertion loss characteristics of the non-reciprocal circuit device according to one embodiment of the present invention.

Insertion loss was measured on non-reciprocal circuit devices produced by using three types of multilayer substrates with second capacitance elements Cf having the maximum capacitance (18.2 pF), the minimum capacitance (17.8 pF) and an average capacitance (18.0 pF), respectively. FIG. 15 shows the insertion loss characteristics of each non-reciprocal circuit device. It is clear from FIG. 15 that a frequency giving an insertion loss peak changed only in as small a range as 5-8 MHz depending on the second capacitance element Cf. with the insertion loss within the target value (0.5 dB). Also, the insertion loss peak was on the same level as that of the conventional non-reciprocal circuit device, in which the second capacitance element Cf was constituted by a capacitor in the multilayer substrate, indicating no deterioration in insertion loss characteristics by using chip capacitors.

It was also confirmed that the variations of the isolation characteristics could be reduced by a similar method. The non-reciprocal circuit device of the present invention thus obtained at a yield of 100% had excellent isolation and insertion loss characteristics in a 830-840 MHz band.

APPLICABILITY IN INDUSTRY

As described above, in a non-reciprocal circuit device comprising part of first and/or second capacitance elements formed by electrode patterns in a multilayer substrate, and the remaining capacitance elements constituted by chip capacitors mounted onto the multilayer substrate, the present invention can reduce the capacitance variations of the first and second capacitance elements in the multilayer substrate by selecting the capacitances of the chip capacitors, without resorting to trimming, etc., thereby providing the non-reciprocal circuit device with excellent electric characteristics at a high yield, because of no damage by working to the multilayer substrate.

What is claimed is:

1. A non-reciprocal circuit device comprising a first inductance element connected between a first input/output port and a second input/output port, a second inductance element connected between said second input/output port and the ground, a first capacitance element connected between said first input/output port and said second input/output port for constituting a parallel resonance circuit with said first inductance element, a second capacitance element connected between said second input/output port and the ground for constituting a parallel resonance circuit with said second inductance element, and a resistance element connected between said first input/output port and said second input/output port, said first and/or second capacitance elements being constituted by parallel-connecting capacitors formed by electrode patterns in a multilayer substrate comprising dielectric sheets and said electrode patterns to chip capacitors mounted onto said multilayer substrate.

2. The non-reciprocal circuit device according to claim 1, wherein said first inductance element has smaller inductance than that of said second inductance element.

3. The non-reciprocal circuit device according to claim 1, wherein said capacitors formed in said multilayer substrate have larger capacitance than that of said chip capacitors.

4. The non-reciprocal circuit device according to claim 3, wherein the capacitance variations of said first and/or second capacitance elements are reduced by selecting the capacitances of said chip capacitors.

5. The non-reciprocal circuit device according to claim 1, wherein a central conductor assembly comprising a first central conductor constituting said first inductance element, a second central conductor constituting said second inductance element and a microwave ferrite member, on which said first and second central conductors are crossing, is placed on said multilayer substrate.

6. The non-reciprocal circuit device according to claim 5, wherein said first central conductor comprises pluralities of conductor lines, and said second central conductor comprises one conductor line.

7. The non-reciprocal circuit device according to claim 5, wherein said first to third electrode patterns are formed on a surface of said multilayer substrate, on which said central conductor assembly is placed, said first electrode pattern being connected to a center portion of said central conductor assembly, said second electrode pattern being connected to a tip end portion of the first central conductor of said central conductor assembly, and said third electrode pattern being connected to a tip end portion of the second central conductor of said central conductor assembly.

8. The non-reciprocal circuit device according to claim 7, wherein input and output terminals are formed on a rear surface of said multilayer substrate; and wherein said first electrode pattern is connected to said output terminal, and said second electrode pattern is connected to said input terminal, both through via-holes formed in said multilayer substrate.

9. A method for producing a non-reciprocal circuit device comprising a first inductance element connected between a first input/output port and a second input/output port, a second inductance element connected between said second input/output port and the ground, a first capacitance element connected between said first input/output port and said second input/output port for constituting a parallel resonance circuit with said first inductance element, a second capacitance element connected between said second input/output port and the ground for constituting a parallel resonance circuit with said second inductance element, and a resistance element connected between said first input/output port and said second input/output port, said first and/or second capacitance elements being constituted by pluralities of parallel-connected capacitors, part of said capacitors being formed by electrode patterns in a multilayer substrate comprising dielectric sheets and said electrode patterns; the method comprising the steps of (a) measuring the capacitance of each capacitor formed in said multilayer substrate, (b) comparing the measured capacitance and a set capacitance of said first and/or second capacitance elements to determine their difference, and (c) mounting one or more chip capacitors each having capacitance corresponding to said difference of capacitance onto said multilayer substrate.

10. The method for producing a non-reciprocal circuit device according to claim 9, wherein a motherboard comprising pluralities of said multilayer substrates is formed, and the capacitance of each capacitor formed in each multilayer substrate is measured to attach a mark to a multilayer substrate, whose measured capacitance is outside the set capacitance.

11. The method for producing a non-reciprocal circuit device according to claim 10, wherein said chip capacitor is mounted onto only a multilayer substrate free from said mark.

* * * * *